Aug. 8, 1961     W. A. BOYCE ET AL     2,995,482

METHOD FOR APPLYING SEALING MATERIAL TO SEALING SURFACES

Filed May 27, 1958

INVENTORS
WALTER A. BOYCE and
GEORGE R. MISTLER.
BY
W. D. Palmer
ATTORNEY.

United States Patent Office 2,995,482
Patented Aug. 8, 1961

2,995,482
METHOD FOR APPLYING SEALING MATERIAL TO SEALING SURFACES
Walter A. Boyce and George R. Mistler, West Orange, N.J., assignors to Westinghouse Electric Corporation, East Pittsburgh, Pa., a corporation of Pennsylvania
Filed May 27, 1958, Ser. No. 738,095
8 Claims. (Cl. 154—116)

This invention relates to envelopes joined together by sealing material and, more particularly, to a method for applying a sealing material to sealing surfaces to form such envelopes.

Sealed-beam lamps are generally well known and usually comprise an envelope formed entirely of so-called hard or borosilicate glass. The envelope is normally formed of a reflector member and a lens member, which are joined together at their peripheries by a glass-fusion technique. The lens and reflector members must be relatively heavy to withstand the shocks of manufacturing and service and the relatively low coefficient of thermal expansion of the so-called borosilicate glass makes possible the local fusion of the hard glass reflector member to the hard glass lens member when fabricating the envelope.

It has been proposed to utilize soft-glass lens and reflector members for a sealed-beam lamp and to join these soft-glass members together with a sealing material such as an epoxy resin. Such epoxy resins polymerize at relatively low temperatures and they possess sufficient elasticity in order to compensate for such dimensional changes as are encountered when soft-glass members are subjected to varying conditions of temperature. Soft glass members are cheaper than hard glass members and it is easier to press soft glass, thus allowing for better tolerance in pressed members. In addition, the elimination of high fusion temperatures permits the use of silver reflecting surfaces rather than aluminum as is now used as silver tends to discolor at hard glass fusion temperatures. The use of a silver reflector increases the reflectivity by some fifteen to twenty percent. It is also desirable for some applications to join a metallic reflector member to a vitreous lens member to form a sealed-beam lamp envelope and to join together two hard-glass members as are now used by means of a material such as an epoxy resin, in order to eliminate the present glass-fusion step.

Various techniques have been tried for applying the epoxy resin to at least one of the sealing surfaces of the members which are to be joined, including applying sufficient heat to the epoxy resin to cause it to convert to liquid form and extruding same through an orifice onto the heated seal area of the lens, or reflector, or both. This method has a disadvantage in that the epoxy resin polymerizes with continued heating and loses its liquid characteristics. In addition, some warm-up time is necessary before the operation begins and the parts which have the resin applied thereto require relatively uniform temperature control. Also, the machinery required is relatively complex and must be run continually to prevent the epoxy resin from polymerizing throughout the unit before it is applied to the appropriate sealing surface which forms a part of the sealed-beam lamp. Further, after each day's operation the entire unit must be cleaned up to prevent heated epoxy resin from polymerizing and this is a time-consuming and tedious operation. The powdered resin can also be poured directly onto the peripheral sealing surfaces, but this is difficult to control.

It is the general object of the invention to avoid and overcome the foregoing and other difficulties of and objections to prior-art practices by the provision of a method for applying to a sealing surface in predetermined amount and substantially uniform manner a finely-divided resin which is polymerizable by heat and which will convert to liquid form at elevated temperatures.

It is a further object to provide a method for applying to a sealing surface a finely-divided epoxy resin in such manner that the resin remains in stable form until it is actually used and requires no preliminary preparation.

It is another object to provide a method for applying a finely-divided epoxy resin to a sealing surface in a very rapid manner and under readily-controlled conditions.

It is an additional object to provide a method for applying finely-divided epoxy resin to a sealing surface so that substantially no resin is lost throughout the operation.

The aforesaid objects of the invention, and other objects which will become apparent as the description proceeds, are achieved by heating at least one of the sealing surfaces to which the resin is to be applied to a predetermined temperature. The resin in its usual and stable condition is in finely-divided form and will convert to liquid form at elevated temperatures. The preheated sealing surface is brought into contacting relationship with finely-divided resin as carried on a conveyor and this contacting relationship is maintained for a predetermined time to convert a predetermined amount of the contacted finely-divided resin into liquid form. The liquified resin adheres to the heated sealing surface in a uniform manner. Thereafter the heated sealing surface is withdrawn or separated from contacting relationship with resin as carried on the conveyor and this resin-carrying sealing surface is forcibly urged against the corresponding sealing surface of another member to bring the sealing surfaces into contiguous relationship. Additional heat is then applied to the contiguous sealing surfaces in order to polymerize the resin which is contained therebetween.

For a better understanding of the invention, reference should be had to the accompanying drawing wherein.

Although the principles of the invention are broadly applicable to applying to any sealing surface in predetermined amount and substantially uniform manner a resin polymerizable by heat and which resin initially is in finely-divided and stable form and will convert to liquid form at elevated temperatures, the invention has particular application with respect to sealed-beam lamp members which are hermetically joined together by epoxy resin and hence it has been so illustrated and will be so described.

Figure 1:
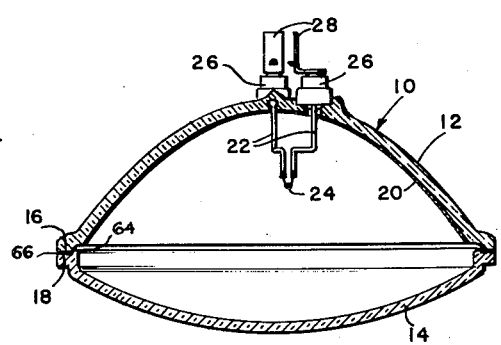
FIG. 1 is a sectional elevational view of a finished sealed-beam lamp wherein the lens and reflector members are hermetically joined together with epoxy resin as applied by the present method.

With specific reference to the form of the invention illustrated in the drawing, in FIG. 1 is shown a sealed-beam lamp 10 comprising a vitreous parabolic reflector member 12 and lens member 14. Either or both of these members can be formed of soft or hard glass. The periphery 16 of the reflector member 12 is hermetically sealed to the periphery 18 of the lens member 14 by means of an epoxy resin. The rest of the lamp construction is conventional in that the reflecting surface 20 is deposited by the well-known vacuum-metallizing technique and the lead conductors 22 are sealed through the back of the reflector member 12 and support a filament 24 substantially at the focal point of the reflecting surface 20. Ferrules 26 are affixed to the exterior surface of the vitreous reflector member 12 and lugs 28 are affixed thereto to facilitate electrical connection to the lamp 10.

Figure 2:
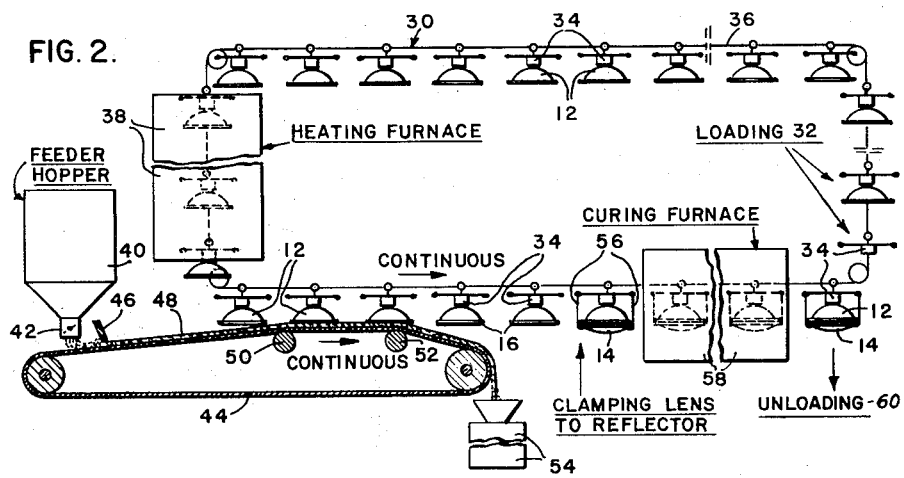
FIG. 2 is a diagrammatic view of an apparatus for practicing one embodiment of the present method wherein the conveyor carrying the finely-divided resin is moved in continuous fashion as is the conveyor carrying the reflector members to which the resin is being applied.

The numeral 30 in FIG. 2 illustrates in diagrammatic form an apparatus for applying epoxy resin to the peripheral sealing surface 16 of a lamp reflector member 12 in accordance with the present method. The reflector members 12 are loaded at station 32 onto heads 34 carried on a continuously-moving conveyor 36. Each of the reflector members 12 is retained by the conveyor-carried heads 34 in such manner that the peripheral sealing surfaces 16 are substantially horizontal and facing downward. Prior to loading on the conveyor-carried heads 34, the reflector members 12 are completed with respect to filament mounting in accordance with conventional practices, and the members 12 are desirably secured in the heads 34 at their upwardly-projecting portions in order that the peripheral sealing surfaces 16 can form an even contact with finely-divided epoxy resin, as explained hereinafter.

After the conveyor-carried reflector members 12 are loaded, they progress in continuous fashion through a heating furnace 38 which heats the reflector members to such temperature as will cause the finely-divided epoxy resin to convert to liquid form. As an example, for the specific epoxy resin as will be described hereinafter, the reflector units are heated in the furnace 38 to a temperature 150° C.

The sealing resin which is utilized is initially in finely-divided form and is loaded into a feeder hopper 40 from which it is fed by a gravity feed through an adjustable orifice 42 to the surface of a continuously-moving belt conveyor 44. A resin-leveling grader 46 is positioned approximately ¼ to ½ inch above the moving conveyor 44 in order to regulate the thickness of the layer 48 of powdered resin which is carried by the belt conveyor 44.

The resin or adhesive material which is utilized to secure the lens and reflector units together is initially in finely-divided form and converts to liquid form at a predetermined elevated temperature. The state of division of the finely-divided resin is not critical, but as an example is such that the finely-divided resin will pass through a 100-mesh screen. When in liquid form or polymerized status, the resin adheres to the sealing surface to which it is to be applied. Epoxy-type resins are preferred. Epoxy resins represent a new class of condensation polymers and are available under various trademarks, such as "Araldite" owned by Ciba Co., Inc., New York, N.Y., or "Epon" owned by Shell Chemical Corp., Emeryville, Calif. The preferred epoxy resin is sold under the trademark "Araldite" AN-100. A typical formula for epoxy resins is as follows:

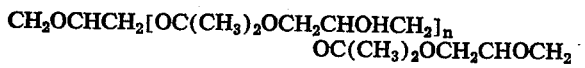

$$CH_2OCHCH_2[OC(CH_3)_2OCH_2CHOHCH_2]_n \\ OC(CH_3)_2OCH_2CHOCH_2$$

The foregoing formula can be varied somewhat and addition polymers can be added to the epoxy resin, as is well known. A catalyst is used to cause these resins to polymerize and on polymerization, the chains lengthen and there is considerable cross-linking between individual chains. There are numerous suitable catalysts for the epoxy resins and for practicing the instant method, a catalyst is used which will not effect polymerization of the resin until triggered by external heat. For the specific "Araldite" AN-100 epoxy resin, which initially is in finely-divided form, phthalic anhydride catalyst in amount of 30% by weight is preferred. The finely-divided epoxy resin and admixed catalyst will remain inactive indefinitely at room temperature. When heated to a temperature approaching 150° C., the epoxy resin and its catalyst will convert from finely-divided form into liquid form. Polymerization of the resin is dependent on a time-temperature function. After the resin has converted to liquid form by a temperature of 150° C. for example, polymerization will be initiated. To speed up the resin curing or polymerization, the preferred temperature used to effect such curing is about 250° C. The selection of the temperatures used for first converting the resin to liquid form and for curing the resin can be varied considerably, depending on the resin used, equipment design and the type of sealing surfaces which are to be joined. Whatever the sealing material utilized, for best operation with the present method the resin should be capable of remaining chemically inactive until its polymerization is triggered by heat. While the foregoing epoxy resin and catalyst therefor are preferred, other catalysts may be substituted in place of the phthalic anhydride.

The resin-carrying belt conveyor 44 is moved across idler pulleys 50 and 52 which causes the resin layer 48 carried by the belt conveyor 44 to be elevated into contacting relationship with the peripheries 16 of the reflector members 12 which are carried on the head-carrying conveyor 36. For best operation, the finely-divided resin layer 48 and the heated reflector peripheries 16 are maintained substantially motionless with respect to one another while they are in contacting relationship in order that the resin layer 48 is not laterally moved on the belt conveyor 44 by any lateral relative movement of the reflector members 12 with respect to the belt conveyor 44. This is readily achieved by moving the head-carrying conveyor 16 and the belt conveyor 44 at substantially the same rate of speed. The distance between the idler pulleys 50 and 52 and the rate of speed of the conveyors 36 and 44 will determine the length of time which the heated peripheral sealing surfaces 16 of the reflector units 12 are in contacting relationship with the finely-divided epoxy resin layer 48. As a specific example, the distance between the idler pulleys 50 and 52 is five feet and the conveyor speeds are one foot per second with a resulting time of contact of five seconds between the peripheral sealing surfaces 16 of the reflector units 12 and the epoxy resin layer 48. Where the reflector member 12 has an average peripheral diameter of about 6.75 inches and a peripheral sealing surface area of about 1.5 square inches, the foregoing schedule will cause approximately 2.4 grams of the epoxy resin to convert to liquid form and to adhere to each heated peripheral sealing surface 16. When applied by the foregoing method, the liquid epoxy resin adheres to the heated peripheral sealing surfaces 16 in a substantially uniform manner. Thereafter when the reflector units 12 pass the idler pulley 52, the heated peripheral sealing surfaces 16 of the reflector units 12 are separated from contacting relationship with the resin layer 48 carried on the belt conveyor 44. Residual resin which is not utilized is deposited into a collecting hopper 54 where it can be stored until reuse.

The heads 34 carrying the reflector members 12, the peripheries 16 of which now carry in liquid form a predetermined amount of epoxy resin, have forcibly urged thereagainst a lens member 14 in such manner that the peripheral sealing surfaces 16 and 18 of the reflector and lens members are forcibly urged into contiguous relationship, separated only by liquified epoxy resin contained therebetween. In the diagrammatic showing, the lens and reflector members are maintained in contiguous relationship by suitable resilient connectors 56, which exert a force of two pounds for example between the lens and reflector members. Thereafter the retained lens and reflector members are heated for ten minutes to a temperature of approximately 250° for example by means of a curing furnace 58. This polymerizes the epoxy resin contained between the peripheral sealing surfaces 16 and 18 of the reflector and lens members in order to effect an hermetic seal. Thereafter the fabricated lamp envelopes are unloaded at unloading station 60. Lamp exhaust, gas-fill and tubulation tip off are then effected in accordance with the usual practices.

Figure 3:
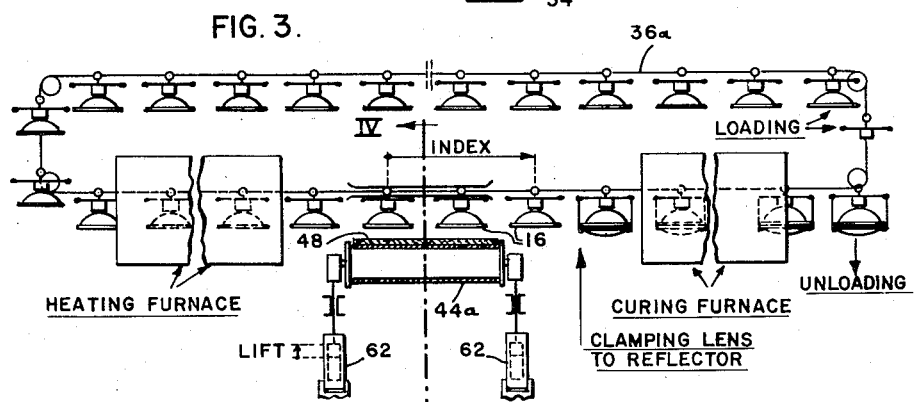
FIG. 3 is a diagrammatic view of an apparatus for practicing another embodiment of the present method wherein the conveyor which carries the finely-divided resin is advanced with an indexing motion and the conveyor carrying the lamp reflector members to which the resin is to be applied is also advanced with an indexing motion.
Figure 4:
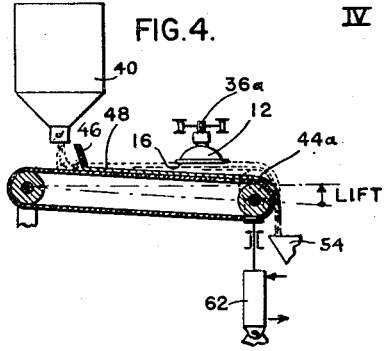
FIG. 4 is a diagrammatic view taken on the line IV—IV in FIG. 3 in the direction of the arrows.

It is also possible to operate the head-carrying conveyor and belt conveyor with an indexing movement and such an apparatus is illustrated in FIGS. 3 and 4 wherein the head-carrying conveyor 36a advances with an indexing start and stop type of motion and the belt conveyor 44a also advances with a similar indexing motion. The belt conveyor 44a is also adapted to be reciprocated in a vertical direction between index movements while the conveyors are substantially stationary in order to bring the heated reflector peripheral sealing surfaces 16 into contacting relationship with the epoxy resin layer 48 which is carried on the belt conveyor 44a. Such a reciprocal movement is readily effected by simple, hydraulic lifts 62 which are adapted to be energized between index movements. Other than this, the apparatus as illustrated in FIGS. 3 and 4 is similar to the apparatus as shown in FIG. 2. As a specific example, in the operation of the apparatus as shown in FIGS. 3 and 4, the peripheral sealing surfaces 16 of the heated reflector members 12 are maintained in contacting relationship with the epoxy resin layer 48 carried by the belt conveyor 44a for a period of five seconds and curing or polymerizing of the resin is accomplished in ten minutes at a temperature of 250° C.

In the preferred operation of the apparatus as shown in FIGS. 2 through 4, the heated peripheral sealing surfaces 16 of the reflector members 12 do not contact the belt conveyors 44 or 44a, but only contact the layer 48 of finely-divided epoxy resin which is carried on these belt conveyors. The amount of resin which is converted to liquid form to adhere to the peripheral sealing surfaces 16 will be determined by the temperature of the reflector members 12, the area of the peripheral sealing surfaces and by the time of contact between the peripheral surfaces 16 and the layer 48 of powdered resin. In the operation of the apparatus as described, there will normally be some residual resin remaining on the belt conveyors, even at those portions of the resin layer 48 which were adjacent the point of contact with the heated peripheral surfaces 16. While a specific example has been carried through in detail, it should be understood that the operation of the foregoing apparatus can be varied considerably, both with respect to the preheating temperatures, speeds of the conveyors, curing furnace temperatures and resins utilized. The foregoing apparatus have been generally shown in diagrammatic form inasmuch as all of the components comprising the apparatus are of generally-standard construction. The present method can also be carried out by hand as well as by the apparatus such as illustrated and described hereinbefore.

Figure 5:
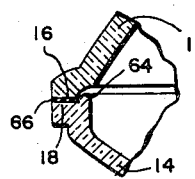
FIG. 5 is a fragmentary sectional enlargement of the completed lamp shown in FIG. 1, illustrating a section of the hermetic seal between the lens and reflector members.
Figure 6:
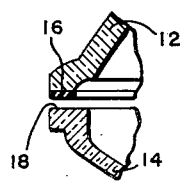
FIG. 6 is a fragmentary sectional enlargement illustrating an alternative embodiment of a section of the lens member wherein the liquified epoxy resin has previously been applied to the sealing area of the reflector member and the lens and reflector members are about to be forced into contiguous relationship.

In FIG. 5 is shown a fragmentary sectional enlargement of a portion of the seal area of the lamp as shown in FIG. 1. In its preferred form, the lens peripheral sealing surface 18 carries a small lip 64 at its inner circumference in order to inhibit any tendency for the liquified epoxy resin to flow into the interior portions of the sealed-beam envelope. Such a lip is not required as illustrated in the embodiment as shown in FIG. 6, as the amount of epoxy resin which is converted to liquid form is readily controlled so that any excess of epoxy resin over the desired amount can be held to a minimum. As a specific example, the layer 66 of cured resin between the lens and reflector member peripheries as shown in FIG. 5 has a thickness of approximately six mils.

Figure 7:
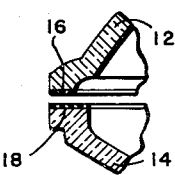
FIG. 7 is a fragmentary sectional enlargement corresponding to FIG. 6, except that the epoxy resin has been previously applied to both the lens and reflector members.

In the preferred form of the present method, the epoxy resin is applied to the peripheral surface 16 of the reflector member 12 in a manner as described hereinbefore. Such an embodiment is shown in FIG. 6 wherein the reflector member peripheral sealing surface 16 has been withdrawn from contacting relationship with the layer 48 of resin which is carried on the belt conveyor 44 and the periphery 18 of lens member 14 is about to be forcibly urged into contiguous relationship therewith. As a possible alternative embodiment, the epoxy resin can be applied in a manner as described to the peripheral sealing surface 18 of the lens member 14. As a further alternative embodiment, the epoxy resin can be applied to both of the peripheral sealing surfaces 16 and 18 of the reflector member 12 and lens member 14 respectively. Such an embodiment is shown in FIG. 7 wherein lens and reflector members which carry the epoxy resin on their peripheral sealing surfaces are about to be forced into contiguous relationship.

While the present method has been described for use in conjunction with sealed-beam lamps which are joined together by epoxy resin, it should be understood that the present method can be utilized to join together any two sealing surfaces. As still another alternative embodiment, the reflector portion of the envelope can be fabricated entirely of metal, adapted to be sealed to a vitreous lens member by a resin applied in the manner as specified hereinbefore.

While an epoxy resin is preferred, the present method can be used to apply to a sealing surface any resin polymerizable by heat which initially is in finely-divided form and which will convert to liquid form at elevated temperatures and when in liquid form and polymerized status adheres to the sealing surface to which it is to be applied.

It will be recognized that the objects of the invention have been achieved by providing a method for applying to a sealing surface in predetermined amount and substantially uniform manner a finely-divided resin which initially is in finely-divided form and is polymerizable by heat and which will convert to liquid form at elevated temperatures. In accordance with this method, the resin as utilized can remain in stable form until it is actually used and requires no preliminary preparation. Further, substantially no resin is lost and the method of application is very rapid and readily-controlled.

While best embodiments of the invention have been illustrated and described in detail, it is to be particularly understood that the invention is not limited thereto or thereby.

We claim:

1. The method of applying to a sealing surface in predetermined amount and substantially uniform manner a resin polymerizable by heat and which resin initially is in finely-divided form and will convert to liquid form at elevated temperatures and when in liquid form and polymerized status adheres to the sealing surface to which it is to be applied, which method comprises carrying on the surface of a conveyor a layer of said resin in finely-divided form, heating said sealing surface to which said resin is to be applied to a predetermined temperature sufficient to cause said resin to convert to liquid form, bringing said heated sealing surface into contacting relationship with resin carried on said conveyor, maintaining said heated sealing surface and said conveyor substantially motionless with respect to one another while said heated sealing surface is in contacting relationship with resin carried on said conveyor, maintaining said heated sealing surface in contacting relationship with resin carried on said conveyor for a predetermined time to convert a predetermined amount of contacted finely-divided resin to liquid form to adhere to said heated sealing surface, and separating said heated sealing surface and adhering liquid resin from resin carried on said conveyor.

2. The method of applying to a sealing surface in predetermined amount and substantially uniform manner a resin polymerizable by heat and which resin initially is in finely-divided form and will convert to liquid form at elevated temperatures and when in liquid form and polymerized status adheres to the sealing surface to which it is to be applied, which method comprises carrying on the surface of a continuously-moving conveyor a layer of said resin in finely-divided form, heating said sealing surface to which said resin is to be applied to a predetermined temperature sufficient to cause said resin to convert to liquid form, bringing said heated sealing surface into contacting relationship with a part of the resin carried on said conveyor, moving said heated sealing surface to maintain same substantially motionless with respect to said continuously-moving conveyor when said heated sealing surface is in contacting relationship with resin carried on said conveyor, maintaining said heated sealing surface in contacting relationship with resin carried on said conveyor for a predetermined time to convert a predetermined amount of contacted finely-divided resin to liquid form to adhere to said heated sealing surface, and separating said heated sealing surface and adhering liquid resin from residual finely-divided resin carried on said conveyor.

3. The method of applying to a sealing surface in predetermined amount and substantially uniform manner a resin polymerizable by heat and which resin initially is in finely-divided form and will convert to liquid form at elevated temperatures and when in liquid form and polymerized status adheres to the sealing surface to which it is to be applied, which method comprises carrying on the surface of an indexing conveyor a layer of said resin in finely-divided form, heating said sealing surface to which said resin is to be applied to a predetermined temperature sufficient to cause said resin to convert to liquid form, bringing said heated sealing surface into contacting relationship with a part of the resin carried on said conveyor when said conveyor is substantially stationary between index movements, maintaining said conveyor substantially stationary and maintaining said heated sealing surface substantially stationary with respect to said conveyor while said heated sealing surface is in contacting relationship with resin carried on said conveyor, maintaining said heated sealing surface in contacting relationship with resin carried on said conveyor for a predetermined time to convert a predetermined amount of contacted finely-divided resin to liquid form to adhere to said heated sealing surface, and separating said heated sealing surface and adhering liquid resin from residual finely-divided resin carried on said conveyor.

4. The method of hermetically joining together two sealing surfaces with epoxy resin which initially is in finely-divided form and will convert to liquid form at elevated temperatures, which method comprises carrying on the surface of a conveyor a layer comprising said epoxy resin in finely-divided form, heating at least one of said sealing surfaces to a predetermined temperature sufficient to cause said epoxy resin to convert to liquid form, bringing said heated sealing surface into contacting relationship with epoxy resin carried on said conveyor, maintaining said heated sealing surface and said conveyor substantially motionless with respect to one another while said heated sealing surface is in contacting relationship with epoxy resin carried on said conveyor, maintaining said heated sealing surface in contacting relationship with epoxy resin carried on said conveyor for a predetermined time to convert a predetermined amount of contacted finely-divided epoxy resin to liquid form to adhere to said heated sealing surface, separating said heated sealing surface and adhering liquid resin from resin carried on said conveyor, promptly forcibly urging said sealing surfaces into contiguous relationship, and applying sufficient heat to said contiguous sealing surfaces to polymerize epoxy resin contained therebetween.

5. The method of hermetically joining together two sealing surfaces at least one of which is vitreous with epoxy resin which initially is in finely-divided form and will convert to liquid form at elevated temperatures, which method comprises carrying on the surface of a conveyor a layer comprising said epoxy resin in finely-divided form, heating one of said sealing surfaces to a predetermined temperature sufficient to cause said epoxy resin to convert to liquid form, bringing said heated sealing surface into contacting relationship with epoxy resin carried on said conveyor, maintaining said heated sealing surface and said conveyor substantially motionless with respect to one another while said heated sealing surface is in contacting relationship with epoxy resin carried on said conveyor, maintaining said heated sealing surface in contacting relationship with epoxy resin carried on said conveyor for a predetermined time to convert a predetermined amount of contacted finely-divided epoxy resin to liquid form to adhere to said heated sealing surface, separating said heated sealing surface and adhering liquid resin from resin carried on said conveyor, promptly forcibly urging said sealing surfaces into contiguous relationship, and applying sufficient heat to said contiguous sealing surfaces to polymerize epoxy resin contained therebetween.

6. The method of hermetically joining together two vitreous sealing surfaces with epoxy resin which initially is in finely-divided form and will convert to liquid form at elevated temperatures, which method comprises carrying on the surface of a conveyor a layer comprising said epoxy resin in finely-divided form, heating said sealing surfaces to a predetermined temperature sufficient to cause said epoxy resin to convert to liquid form, bringing each of said heated sealing surfaces into contacting relationship with epoxy resin carried on said conveyor, maintaining said heated sealing surfaces and said conveyor substantially motionless with respect to one another while said heated sealing surfaces are in contacting relationship with epoxy resin carried on said conveyor, maintaining said heated sealing surfaces in contacting relationship with epoxy resin carried on said conveyor for a predetermined time to convert a predetermined amount of contacted finely-divided epoxy resin to liquid form to adhere to said heated sealing surfaces, separating said heated sealing surfaces and adhering liquid resin from resin carried on said conveyor, promptly forcibly urging said sealing surfaces into contiguous relationship, and applying sufficient heat to said contiguous sealing surfaces to polymerize epoxy resin contained therebetween.

7. The method of applying to a plurality of sealing surfaces in predetermined amount and substantially uniform manner a resin polymerizable by heat and which resin initially is in finely-divided form and will convert to liquid form at elevated temperatures and when in liquid form and polymerized status adheres to the sealing surfaces to which it is to be applied, which method comprises applying from a fixed location to the surface of a moving conveyor as it passes such fixed location a layer of said resin in finely-divided form, heating said sealing surfaces to which said resin is to be applied to a predetermined temperature sufficient to cause said resin to convert to liquid form, successively moving said heated sealing surfaces into contacting relationship with finely-divided resin carried on said conveyor, maintaining said heated sealing surfaces and said conveyor substantially motionless with respect to one another while said heated sealing surfaces are in contacting relationship with resin carried on said conveyor, maintaining said heated sealing surfaces in contacting relationship with resin carried on said conveyor for a predetermined time to convert a predetermined amount of contacted finely-divided resin to liquid form to adhere to said heated sealing surfaces, withdrawing said heated sealing surfaces and adhering liquid resin from resin carried on said conveyor, and thereafter discharging resin remaining in finely-divided form from the surface of said conveyor and into a collecting hopper for later reapplication to the surface of said moving conveyor.

8. The method of applying to a plurality of vitreous sealing surfaces in predetermined amount and substantially uniform manner an epoxy resin polymerizable by heat and which resin initially is in finely-divided form and will convert to liquid form at elevated temperatures, which method comprises applying from a fixed location to the surface of a moving conveyor as it passes such fixed location a layer of said epoxy resin and a catalyst therefor in finely-divided form, heating said sealing surfaces to which said epoxy resin is to be applied to a predetermined temperature sufficient to cause said epoxy resin to convert to liquid form, successively moving said heated sealing surfaces into contacting relationship with finely-divided epoxy resin carried on said conveyor, maintaining said heated sealing surfaces and said conveyor substantially motionless with respect to one another while said heated sealing surfaces are in contacting relationship with epoxy resin carried on said conveyor, maintaining said heated sealing surfaces in contacting relationship with epoxy resin carried on said conveyor for a predetermined time to convert a predetermined amount of contacted finely-divided epoxy resin to liquid form to adhere to said sealing surfaces, withdrawing said heated sealing surfaces and adhering liquid resin from resin carried on said conveyor, and thereafter discharging epoxy resin remaining in finely-divided form from the surface of said conveyor and into a collecting hopper for later reapplication to the surface of said moving conveyor.

References Cited in the file of this patent

UNITED STATES PATENTS

| 914,623 | Williams | Mar. 9, 1909 |
| 2,490,776 | Braunsdorff | Dec. 13, 1949 |
| 2,603,575 | Schramm | July 15, 1952 |

FOREIGN PATENTS

| 745,057 | Great Britain | Dec. 17, 1952 |

OTHER REFERENCES

British Plastics, August 1950, pages 56–59.